Figure 1:
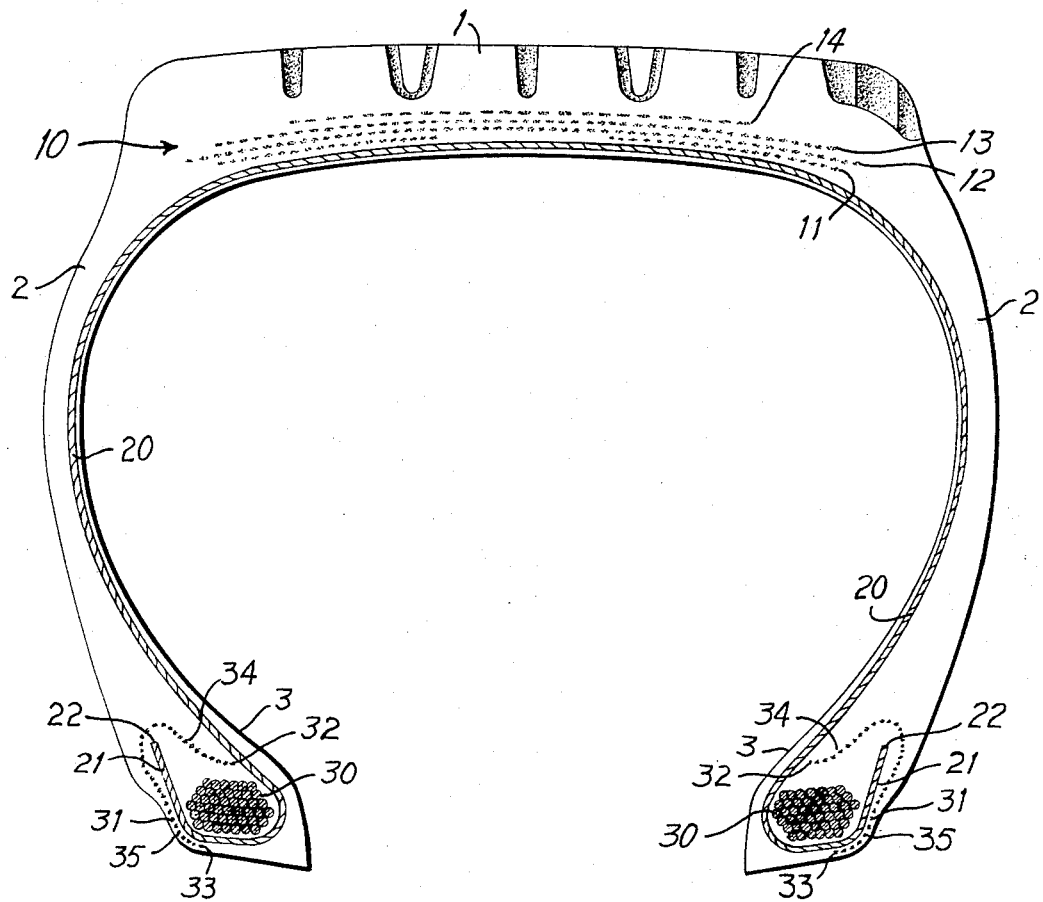

United States Patent [19]

Montagne

[11] 3,777,799
[45] Dec. 11, 1973

[54] PNEUMATIC TIRES
[75] Inventor: Jean Bernard Montagne, Cebazat, France
[73] Assignee: Compagnie Generale des Establissements Michelin, raison sociale Michelin & Cie, Clermont-Ferrand, France
[22] Filed: June 1, 1972
[21] Appl. No.: 258,877

[30] Foreign Application Priority Data
June 8, 1971  France ............................ 7120821

[52] U.S. Cl............................................. 152/362 R
[51] Int. Cl............................................. B60c 15/06
[58] Field of Search .................. 152/362 R, 362 CS

[56] References Cited
UNITED STATES PATENTS
3,244,215  4/1966  Bridge, Jr. et al. ........... 152/362 CS
2,966,933  1/1961  Boussu et al..................... 152/362 R
3,612,138  10/1971  Ravenhall ....................... 152/362 R FOREIGN PATENTS OR APPLICATIONS
961,156  6/1964  Great Britain .................. 152/362 R Primary Examiner—Gerald M. Forlenza
Assistant Examiner—Robert Saifer
Attorney—Granville M. Brumbaugh et al.

[57] ABSTRACT

The damage resistance at the junction of the sidewall and the bead of a radial carcass tire having a carcass ply turned upwardly in each bead around a bead wire is improved by folding a stiffener around the end of the upturned portion of the carcass ply and bringing the ends of the stiffener into the vicinity of the bead wire.

3 Claims, 2 Drawing Figures

PATENTED DEC 1 1 1973 3,777,799

PNEUMATIC TIRES

The present invention relates to improvements in radial carcass pneumatic tires, said improvements concerning more particularly the structure of the beads.

As is known, a radial carcass tire has three reinforcements, namely, a crown reinforcement which reinforces the tread, a carcass reinforcement which reinforces the entire tire but more particularly the sidewalls, and a bead reinforcement which stiffens the regions of the tire in contact with the rim and assures its retention on the rim.

The crown reinforcement is formed by the superimposing of a plurality of plies, preferably of metal cords, forming a rigid assembly. The carcass reinforcement, on the other hand, is flexible, and for this purpose is formed of metal or textile cords arranged in radial planes of the tire and anchored at their ends in each bead around a bead wire. The beads finally, as they do not have sufficient rigidity, despite the bead wires and the carcass cords, to lock themselves on the rim, are reinforced by "stiffeners." For this purpose each bead has, along the face thereof which is in contact with the rim edge, a short ply of cords, generally of metal, extending over the entire height of the bead and arranged along an angle of about 20° with the circumferential direction.

In this conventional structure, there are present at the junction between the sidewall and the bead individual points formed by the end of the stiffener and the end of the upward turned portion of the carcass ply. These individual points constitute the seat of concentrations of stresses and the adjacent rubber is subjected to a very high rate of working. This manifests itself by the appearance of fatigue cracks near these points, which cracks propagate themselves gradually up to the other wall of the tire, which then facilitates the penetration of moisture and the corrosion of the cords. In the case of tires for trucks and other heavy vehicles, the life of the tire is frequently limited by damage at the junction of the sidewall and the bead.

The existence of a weak zone at the junction of the sidewall and the bead and located at the ends of the stiffener and of the carcass ply has been known for a long time. Numerous remedies have been attempted. It has been possible, of course, to reduce this drawback which is inherent in the radial carcass tire by in particular a suitable selection of the materials. However, it has not been possible to eliminate it and up to now it has been considered a necessary and inevitable evil.

The object of the present invention is a new structure of the beads of a radial carcass tire which does not have this drawback and which makes it possible to increase considerably the life of such a tire by suppressing or considerably retarding the appearance of damage at the junction of the sidewall and the bead.

The pneumatic tire in accordance with the invention, which has at least one carcass ply of radial wires or cords turned upward in each bead around a bead wire, as well as a stiffener reinforcing each bead, is characterized by the fact that the stiffener is folded around the end of the upturned portion of the carcass ply and moves away from said upturned portion in the direction towards the carcass ply.

In accordance with preferred embodiments:

a. The two ends of the stiffener are both near the bead wire so as to enclose the entire upturned portion of the carcass ply between the bead wire and the stiffener.

b. The two ends of the stiffener are in the vicinity of the zones of tangency with the bead wire, on the one hand, of the upturned portion of the carcass ply and, on the other hand, of the carcass ply proper.

c. The stiffener is wound around the bead wire on one or the other of its faces, its two ends being in the vicinity of each other and within the base of the bead.

The special structure of the bead, and in particular of the stiffener in accordance with the invention, has the effect on the one hand of isolating the end of the carcass ply from the contacting rubber directly stressed by the movements of the carcass ply and on the other hand of bringing the two ends of the stiffener to the vicinity of the bead wire, that is to say, into a region which is not substantially disturbed by the deformation of the tire while rotating.

The provision of a loop-shaped stiffener over the wire bead furthermore has the consequence of increasing the effective volume of the bead wire and the anchoring area of the carcass ply. It can, as a matter of fact, be considered that the entire volume of rubber contained between the bead wire and the stiffener is practically immobilized and made nondeformable. The stiffener in accordance with the invention thus increases the effectiveness of the bead wire and therefore makes it possible, if desired, to lighten the latter for the obtention of the same nonextensibility and the same resistance of the bead as in a conventional tire.

The invention will be fully understood on basis of the embodiment illustrated in the accompanying drawings.

Figure 2:
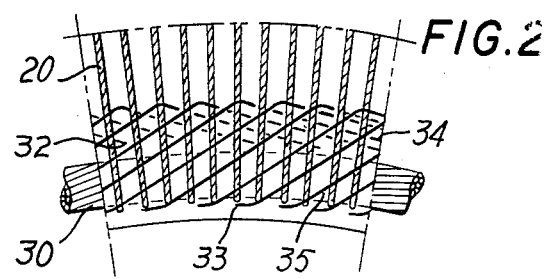

In the drawings:

FIG. 1 shows in cross section a tire according to the invention,

FIG. 2 shows in front view a portion of the bead shown in cross section in FIG. 1, the rubber being assumed transparent and the cords being shown further apart from each other than they actually are, and FIG. 1 shows in cross section a tire having a tread 1, sidewalls 2 and beads 3. This tire has a crown reinforcement 10 formed of a plurality of superimposed plies 11, 12, 13 and 14 reinforcing the tread. It furthermore comprises a carcass reinforcement 20 formed of radial cords anchored around two bead wires 30 and extending beyond the bead wires via upturned portions 21 which terminate at 22. Finally, the beads 3 contain, in addition to the bead wires 30, a stiffener 31 the ends of which are located at 32 and 33.

In accordance with the invention, the stiffener 31 is bent in a loop forming two portions 34 and 35 around the upturned portion 21 of the carcass ply 20. The end 22 of the carcass ply 20 is thus enclosed between the bead wire 30 and the stiffener 31, the upturned portion 21 being therefore isolated from the carcass ply 20 proper.

Moreover, the ends 32 and 33 of the stiffener 31 are located in the vicinity of the zones of tangency of the carcass ply 20 proper and its upturned portion 21 with the bead wire 30.

As shown in FIG. 2, the cords of the carcass ply 20 and its upturned portion 21 form an angle of about 90° with the bead wire 30; those of the stiffener 31 form an angle of about 22° with the bead wire 30, with a different direction in the two portions 34 and 35.

The building of a tire in accordance with the invention does not present any particular difficulty; after the placing of the carcass ply 20 on the building drum, a rubber strip intended to separate the carcass ply 20 and the stiffener 31 is placed thereon; this is followed by the stiffener 31, the bead wire 30 and a rubber strip intended to separate the bead wire and the stiffener 31. The upturned portion 21 of the carcass ply 20 is then bent around, a rubber strip is applied and the portion 35 of the stiffener 31 is then bent around; finally, the sidewall rubber 2 is applied before shaping the tire and placing on the tread reinforcement 10 and the tread 1.

An endurance test carried out on a tire in accordance with the invention showed that one could at least double the mileage obtainable before the appearance of damage at the junction of the bead and the sidewall. It goes without saying that the example described is merely one particular form of the invention and that various changes could be made therein without going beyond its scope. In particular the two portions 34 and 35 of the stiffener 31 could be arranged along the upturned portion 21 of the carcass ply 20; the stiffener 31 could be extended to a greater or lesser extent in the direction of the sidewall or, on the other hand, the upturned portion 21 of the carcass ply 20 could be shortened and the stiffener 31 brought closer to the wire bead 30; one could also wind the two portions 34 and 35 of the stiffener 31 around the bead wire 30 in such a manner that they overlap in part, for instance along the base of the bead. The essential feature is to isolate the end 22 of the upturned portion 21 from the carcass ply 20 proper and to bring the two ends 32 and 33 of the stiffener 31 into the vicinity of the bead wire 30.

What is claimed is:

1. A pneumatic tire comprising at least one carcass ply with radial cords or cables terminating in each bead in an upturned portion around a bead wire and strongly inclined in the direction of the carcass ply and a stiffener reinforcing each bead, each bead having a strongly inclined seat and the stiffener being arranged approximately midway between the upturned portion of the carcass ply and the other wall of the tire, characterized by the fact that the stiffener is folded around the end of the upturned portion of the carcass ply at the level of said end and then moves away from said end towards the point of tangency of the carcass ply with the bead wire, without, however, touching either the carcass ply or the bead wire.

2. The tire defined by claim 1 wherein the two ends of the stiffener are both near the bead wire so as to enclose the entire upturned portion of the carcass ply between the bead wire and the stiffener.

3. The tire defined by claim 1 wherein said stiffener is separated from the carcass ply by a rubber strip.

* * * * *